(12) United States Patent
Inoue et al.

(10) Patent No.: US 10,564,265 B2
(45) Date of Patent: Feb. 18, 2020

(54) MEASUREMENT DEVICE AND MEASUREMENT METHOD

(71) Applicant: Topcon Corporation, Itabashi-ku, Tokyo (JP)

(72) Inventors: Takahiro Inoue, Tokyo (JP); Satoshi Yanobe, Tokyo (JP); Hideyuki Matsumoto, Tokyo (JP); Fumio Ohtomo, Tokyo (JP)

(73) Assignee: Topcon Corporation, Itabashi-ku, Tokyo (JP)

( * ) Notice: Subject to any disclaimer, the term of this patent is extended or adjusted under 35 U.S.C. 154(b) by 151 days.

(21) Appl. No.: 15/713,841

(22) Filed: Sep. 25, 2017

(65) Prior Publication Data

US 2018/0095166 A1 Apr. 5, 2018

(30) Foreign Application Priority Data

Sep. 30, 2016 (JP) .................................. 2016-192895

(51) Int. Cl.
*G01S 7/481* (2006.01)
*G01S 17/02* (2006.01)
(Continued)

(52) U.S. Cl.
CPC ............ *G01S 7/4817* (2013.01); *G01B 21/04* (2013.01); *G01B 21/22* (2013.01); *G01C 1/04* (2013.01);
(Continued)

(58) Field of Classification Search
CPC ...... G01S 7/4817; G01S 17/023; G01S 17/89; G01B 11/24; G01B 21/04; G01B 21/22; G01C 3/08; G01C 15/002; G01C 1/04
See application file for complete search history.

(56) References Cited

U.S. PATENT DOCUMENTS 4,313,654 A * 2/1982 Matsui ..................... G02B 7/32
356/3.06
8,319,952 B2 11/2012 Otani et al.
(Continued)

FOREIGN PATENT DOCUMENTS

| JP | 2013167508 A | 8/2013 |
| JP | 2013181758 A | 9/2013 |
| JP | 2016151422 A | 8/2016 |

OTHER PUBLICATIONS

Non-Final Office Action dated Aug. 19, 2019, in connection with U.S. Appl. No. 15/636,767, 6 pgs.

*Primary Examiner* — Bryan Bui
(74) *Attorney, Agent, or Firm* — Chiesa Shahinian & Giantomasi PC

(57) ABSTRACT

A measurement device and measurement method are provided which are capable of measuring the inclination of a measurement target object surface both with a simple configuration and at high speed. The measurement device includes: a rangefinding light emitting section; a rangefinding unit configured to receive reflected rangefinding light; an optical axis deflection section provided on an optical path common to rangefinding light and reflected rangefinding light, and configured to deflect optical axes thereof; a motor configured to cause the optical axis deflection section to rotate; an emission direction detection unit configured to detect a deflection angle and deflection direction resulting from the optical axis deflection section; and a computation controller that measures the inclination of a measurement target object surface with respect to the emission optical axis on the basis of acquired coordinate data on the measurement target object surface.

14 Claims, 21 Drawing Sheets

(51) Int. Cl.
   *G01C 3/08*     (2006.01)
   *G01S 17/89*    (2006.01)
   *G01B 21/22*    (2006.01)
   *G01C 15/00*    (2006.01)
   *G01C 1/04*     (2006.01)
   *G01B 21/04*    (2006.01)

(52) U.S. Cl.
   CPC ............ *G01C 3/08* (2013.01); *G01C 15/002* (2013.01); *G01S 17/023* (2013.01); *G01S 17/89* (2013.01)

(56) References Cited

U.S. PATENT DOCUMENTS

| | | |
|---|---|---|
| 8,798,959 B2 | 8/2014 | Mahajan |
| 9,619,433 B2 | 4/2017 | Fujita et al. |
| 2012/0062867 A1 | 3/2012 | Shibatani |
| 2015/0019164 A1 | 1/2015 | Fujita et al. |
| 2015/0204976 A1 | 7/2015 | Bösch |
| 2016/0238385 A1 | 8/2016 | Ohtomo et al. |
| 2018/0023944 A1* | 1/2018 | Ohtomo ............... G01B 11/026 356/4.01 |

* cited by examiner

MEASUREMENT DEVICE AND MEASUREMENT METHOD

CROSS-REFERENCE TO RELATED APPLICATIONS

This application claims the benefit of Japanese Patent Application No. 2016-192895, filed Sep. 30, 2016, which is incorporated herein by reference in its entirety.

BACKGROUND

1. Technical Field

The present invention relates to a measurement device and measurement method capable of measuring a three-dimensional profile of a measurement target object.

2. Related Art

Measurement devices to measure three-dimensional coordinates of a measurement target object include, for example, total stations and three-dimensional laser scanners. Such measurement devices measure three-dimensional coordinates at a plurality of points on a measurement target object surface, and can measure the inclination of the measurement target object surface on the basis of the three-dimensional coordinates measured at the plurality of points.

However, in total stations, collimation and measurement of target points needs to be performed for at least three points on a measurement target object surface, and the inclination of the measurement target object surface is then computed on the basis of the three-dimensional coordinates of the measured points. For three-dimensional laser scanners, after acquiring coordinate data for a measurement target object surface, points to be used need to be selected on a PC or the like, and the inclination of the measurement target object surface is then computed on the basis of the three-dimensional coordinates of the selected points.

Hence, processing is complicated when using total stations or three-dimensional laser scanners, and time is required to measure the inclination of the measurement target object surface. The inclination of a measurement target object surface is accordingly difficult to measure in real time.

There are moreover devices that find the inclination of a measurement target object surface by employing a plurality of distance meters to measure a plurality of points on the measurement target object surface at the same time. However, the configuration of such devices is complicated due to the need to employ as many distance meters as the number of measurement points, which also increases the manufacturing cost. (See JP 2013-167508A, JP 2013-181758A, and JP 2016-151422A).

SUMMARY

The invention provides a measurement device and measurement method capable of measuring the inclination of a measurement target object surface both with a simple configuration and at high speed.

An aspect of the invention relates to a measurement device including: a rangefinding light emitting section configured to emit rangefinding light; a rangefinding unit configured to receive reflected rangefinding light reflected from a measurement target object and perform rangefinding; an optical axis deflection section provided on an optical path common to the rangefinding light and the reflected rangefinding light, and configured to deflect optical axes of the rangefinding light and the reflected rangefinding light at the same deflection angle and the same direction as each other; a motor configured to cause the optical axis deflection section to rotate about an emission optical axis of the rangefinding light; an emission direction detection unit configured to detect a deflection angle and deflection direction resulting from the optical axis deflection section; and a computation controller. In such a measurement device, a measurement target object is scanned in a circular shape with the rangefinding light by rotation of the optical axis deflection section. In such a measurement device, the computation controller measures inclination of the measurement target object surface with respect to the emission optical axis on the basis of acquired coordinate data on the measurement target object surface.

An aspect of the invention also relates to a measurement device in which: the optical axis deflection section includes a wedge prism, and a deflection angle adjustment motor configured to cause the wedge prism to tilt about an axis orthogonal to the emission optical axis; and the deflection angle of the rangefinding light can be varied by the deflection angle adjustment motor being driven.

An aspect of the invention also relates to a measurement device wherein the optical axis deflection section includes a pair of optical prisms each having a circular shape, the pair of optical prisms being independently rotatable and superimposed on each other. In such a measurement device, each of the pair of optical prisms includes a rangefinding light axis deflection section formed at a central portion of each of the pair of optical prisms and configured to deflect the rangefinding light at a required deflection angle and in a required direction, and a reflected rangefinding light axis deflection section formed at an outer circumferential portion of each of the pair of optical prisms and configured to deflect the reflected rangefinding light at a deflection angle and in a direction identical to those of the rangefinding light axis deflection section. In such a measurement device, the computation controller rotates the pair of optical prisms together as one at a constant speed.

An aspect of the invention also relates to a measurement device, further including an orientation detection device capable of detecting an inclination angle and inclination direction with respect to the horizontal or the vertical. In such a measurement device, an inclination of the measurement target object surface with respect to the horizontal or the vertical is measured on the basis of the coordinate data and an orientation detection result.

An aspect of the invention also relates to a measurement device, wherein the computation controller rotates the motor at a predetermined speed, computes a difference between a target rotation angle and an actual rotation angle of the motor at intervals of a predetermined duration, corrects the target rotation speed of the motor on the basis of the difference, and controls the motor on the basis of the target rotation speed that is corrected and an actual rotation speed.

An aspect of the invention also relates to a measurement device, further including an imaging section having an imaging optical axis parallel to and at a known distance from the emission optical axis.

An aspect of the invention also relates to a measurement method, including the steps of: deflecting rangefinding light by an optical axis deflection section and emitting the rangefinding light; rotating the optical axis deflection section about an emission optical axis of the rangefinding light to scan a measurement target object surface in a circular shape with the rangefinding light; and finding a sine curve on the basis of acquired coordinate data on the measurement target object surface, and measuring an inclination of the measurement target object surface with respect to the emission optical axis on the basis of an amplitude and phase of the sine curve.

Moreover, an aspect of the invention also relates to a measurement method, further including performing Fourier transformation on the sine curve, and measuring the inclination of the measurement target object surface with respect to the emission optical axis on the basis of an amplitude and phase of a frequency component obtained from the Fourier transformation matching a rotation speed of the optical axis deflection section.

According to an aspect of the invention, the following configuration is included: the rangefinding light emitting section configured to emit rangefinding light; the rangefinding unit configured to reflected receive rangefinding light reflected from a measurement target object and perform rangefinding; the optical axis deflection section provided on an optical path common to the rangefinding light and the reflected rangefinding light, and configured to deflect the optical axes of the rangefinding light and the reflected rangefinding light at the same deflection angle and the same direction as each other; the motor configured to cause the optical axis deflection section to rotate about an emission optical axis of the rangefinding light; the emission direction detection unit configured to detect a deflection angle and deflection direction resulting from the optical axis deflection section; and the computation controller. Moreover, a measurement target object surface is scanned in a circular shape with the rangefinding light by rotation of the optical axis deflection section, and the computation controller measures the inclination of the measurement target object surface with respect to the emission optical axis on the basis of acquired coordinate data on the measurement target object surface. Hence, complicated processing such as post processing steps after acquiring the coordinate data can thereby be eliminated, enabling measurement of the inclination of the measurement target object surface to be performed in a short period of time. The device configuration can also be simplified, and a reduction in manufacturing cost can be achieved.

According to an aspect of the invention, the following steps are included: deflecting rangefinding light by an optical axis deflection section and emitting the rangefinding light; rotating the optical axis deflection section about an emission optical axis of the rangefinding light to scan a measurement target object surface in a circular shape with the rangefinding light; and finding a sine curve on the basis of acquired coordinate data on the measurement target object surface, and measuring an inclination of the measurement target object surface with respect to the emission optical axis on the basis of an amplitude and phase of the sine curve. Hence, the excellent advantageous effects are exhibited of enabling complicated processing such as post processing steps after acquiring the coordinate data to be eliminated, thereby enabling the inclination measurement of the measurement target object surface to be performed in a short period of time.

BRIEF DESCRIPTION OF DRAWINGS

The invention will be described with reference to the accompanying drawings, wherein like numbers reference like elements.

DESCRIPTION OF EMBODIMENTS

Description follows regarding embodiments of the invention, with reference to the drawings.

Figure 1:
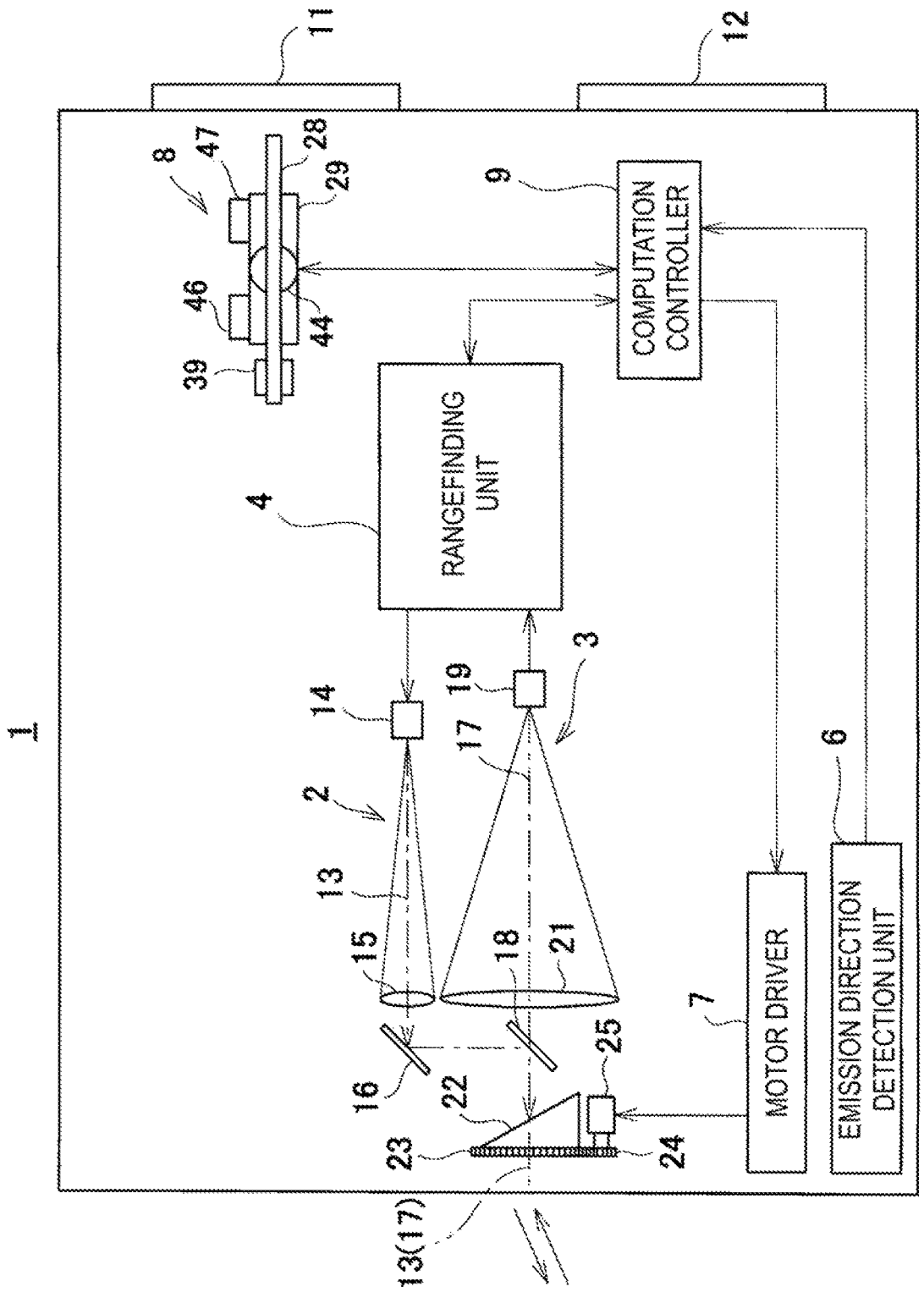
FIG. 1 is a schematic diagram illustrating an optical system of a measurement device according to a first embodiment of the invention.

A description is first given of a measurement device according to a first embodiment of the invention, with reference to FIG. 1.

A rangefinding light emitting section 2, a light receiving section 3, a rangefinding unit 4, an emission direction detection unit 6, a motor driver 7, an orientation detection device 8 including a gimbal mechanism, and a computation controller 9 serving as a measurement controller are integrated together and housed inside a measurement device 1. The measurement device 1 also includes an operation unit 11 and a display unit 12.

A touch panel may be employed for the display unit 12 so as to double as the operation unit 11. Note that the measurement device 1 is capable of being held in one hand (is handheld).

The rangefinding light emitting section 2 has an emission optical axis 13, and a light emitting element 14, such as a laser diode (LD) is provided on the emission optical axis 13. A projection lens 15 is also provided on the emission optical axis 13. Moreover, the emission optical axis 13 is deflected by a first reflection mirror 16 serving as a deflection optical member provided on the emission optical axis 13, and by a second reflection mirror 18 serving as a deflection optical member provided on a reception light optical axis 17 (described later), such that the emission optical axis 13 coincides with the reception light optical axis 17. The first reflection mirror 16 and the second reflection mirror 18 configure an emission optical axis deflection section.

The light receiving section 3 has the reception light optical axis 17. Rangefinding light reflected from a measurement target object or a target having retroreflectivity, such as a prism or a reflection mirror, is received by the light receiving section 3.

A light receiving element 19, such as a photodiode (PD), is provided on the reception light optical axis 17. An imaging lens 21 is also disposed on the reception light optical axis 17. The imaging lens 21 forms the reflected rangefinding light into an image on the light receiving element 19. The light receiving element 19 receives the reflected rangefinding light and generates a light reception signal. The light reception signal is input to the rangefinding unit 4.

Moreover, a wedge prism 22, which is an optical axis deflection section, is disposed on the reception light optical axis 17 (namely, on the emission optical axis 13) at the object side of the imaging lens 21. The wedge prism 22 is configured to deflect the emission optical axis 13 and the reception light optical axis 17 by a predetermined angle. The angle of deflection of the wedge prism 22 is known.

A ring gear 23 is fitted at the outer periphery of the wedge prism 22. A drive gear 24 meshes with the ring gear 23. The drive gear 24 is fixed to an output shaft of a motor 25. The motor 25 is electrically connected to the motor driver 7.

A motor capable of detecting the rotation angle, or a motor that rotates according to a drive input value, for example a pulse motor, is employed as the motor 25. Alternatively, a rotation angle detector that detects a rotation amount (rotation angle) of the motor, such as an encoder, may be employed to detect the rotation amount of the motor 25. The motor 25 is controlled by the motor driver 7 on the basis of the detected rotation amount.

The drive gear 24 and the motor 25 are provided in positions that do not interfere with the rangefinding light emitting section 2, for example, below the ring gear 23.

The rangefinding unit 4 controls the light emitting element 14 to emit a laser beam serving as rangefinding light. The emission optical axis 13 is deflected by the wedge prism 22 such that the rangefinding light is directed toward the measurement point.

The reflected rangefinding light reflected from the measurement target object is incident to the wedge prism 22 and the imaging lens 21, and is received by the light receiving element 19. The light receiving element 19 sends the light reception signal to the rangefinding unit 4. The rangefinding unit 4 finds the range of the measurement point (the point onto which the rangefinding light was shone) on the basis of the light reception signal from the light receiving element 19.

The emission direction detection unit 6 detects the rotation angle of the motor 25 by counting drive pulses input to the motor 25. Alternatively, the emission direction detection unit 6 detects the rotation angle of the motor 25 on the basis of a signal from an encoder (not illustrated). The emission direction detection unit 6 computes the rotational position of the wedge prism 22 on the basis of the rotation angle of the motor 25.

Moreover, the emission direction detection unit 6 computes the deflection angle and the emission direction of the rangefinding light on the basis of the refractive index and the rotational position of the wedge prism 22, and inputs the computation result to the computation controller 9. Note that an encoder may be provided on the wedge prism 22, and the rotational position of the wedge prism 22 may be computed on the basis of the detection result of the encoder.

The computation controller 9 is configured by an input-output controller, a central processing unit (CPU), a storage unit, and the like. The storage unit is stored with programs such as: a rangefinding program for controlling rangefinding operations; a fitting program for fitting an ellipse to a measurement target object surface on the basis of rangefinding results; an inclination measurement program for computing the inclination angle and inclination direction of the measurement target object surface with respect to the rotation axial center of the wedge prism 22 on the basis of the fitted ellipse; a prism control program for controlling the motor 25 with the motor driver 7; a direction angle computation program for computing a direction angle (horizontal angle, vertical angle) of the emission optical axis 13 on the basis of computed results from the emission direction detection unit 6 of the emission direction of the rangefinding light; an orientation detection program for detecting orientation with the orientation detection device 8; and an image display program for displaying image data, rangefinding data, and the like on the display unit 12.

As a mode of measurement, the wedge prism 22 is fixed at a predetermined rotation angle and the rangefinding is performed. As a result, rangefinding can be performed for a particular measurement point. Moreover, rangefinding is executed while the rotation angle of the wedge prism 22 is varied. As a result, rangefinding is executed while scanning with the rangefinding light in a circle centered on the emission optical axis 13 (the reception light optical axis 17) deflected by the first reflection mirror 16 and the second reflection mirror 18. This enables rangefinding data (scan data) to be acquired along a scan path.

Moreover, the emission direction angle of the rangefinding light can be detected from the rotation angle of the motor 25, enabling three-dimensional rangefinding data to be acquired by associating emission direction angles and rangefinding data.

Figure 2:
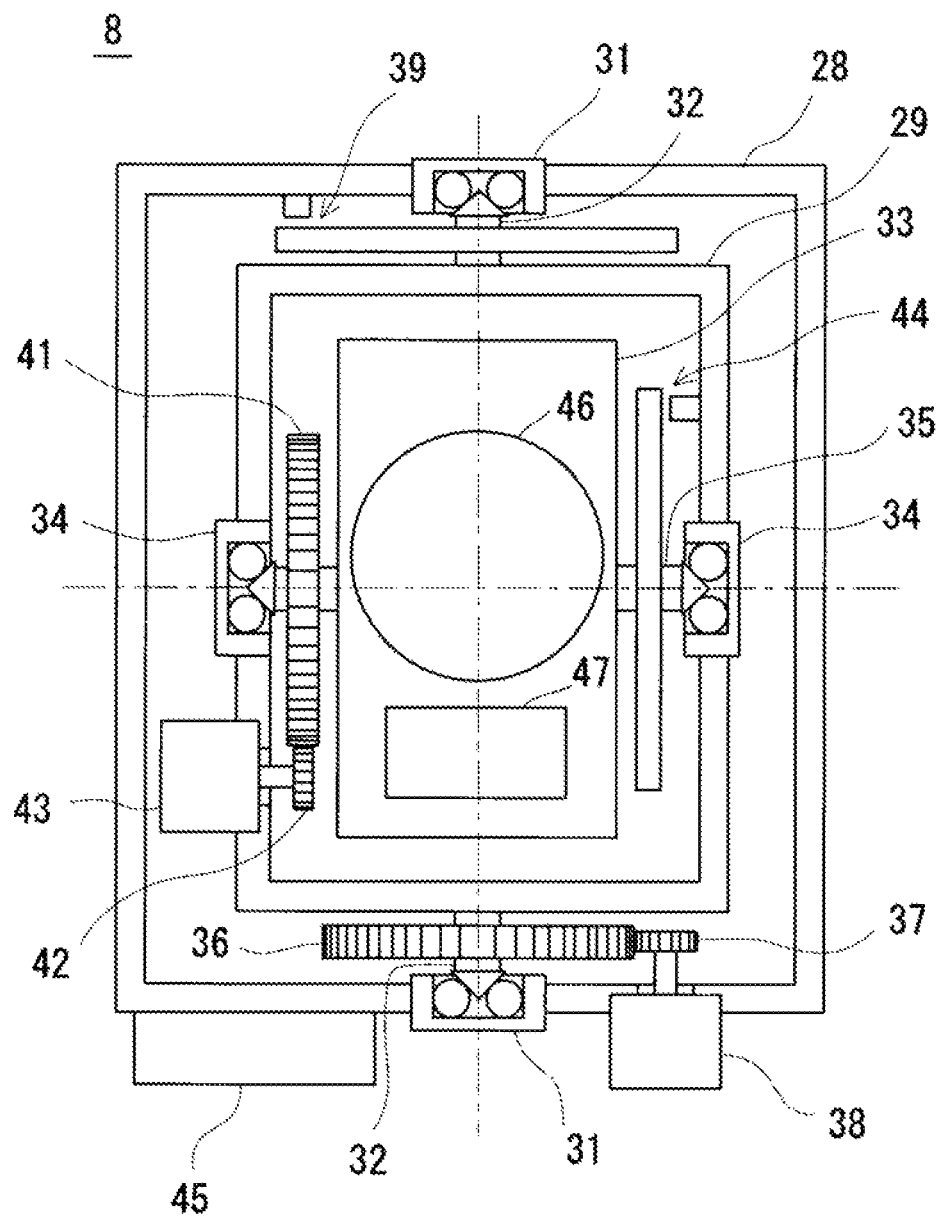
FIG. 2 is a plan view illustrating an orientation detection device.

Next, a description follows regarding the orientation detection device 8, with reference to FIG. 2. FIG. 2 is a plan view of the orientation detection device 8. A rectangular frame shaped inner frame 29 is rotatably provided at the interior of a rectangular frame shaped outer frame 28 through the shaft bearings 31 and a pair of first horizontal shafts 32. An inclination detection unit 33 is rotatably provided at the interior of the inner frame 29 through shaft bearings 34 and a second horizontal shaft 35.

The inner frame 29 is rotatable through 360° about the first horizontal shafts 32, 32 and the inclination detection unit 33 is rotatable through 360° about the second horizontal shaft 35.

The inclination detection unit 33 is accordingly supported so as to be rotatable in two axial directions with respect to the outer frame 28, and the mechanism to rotatably support the inner frame 29 and the mechanism to rotatably support the inclination detection unit 33 configure a gimbal mechanism. The inclination detection unit 33 is supported by the gimbal mechanism with respect to the outer frame 28, such that the inclination detection unit 33 is not subject to any restrictions in rotation and is rotatable in all directions with respect to the outer frame 28.

A first driven gear 36 is fitted over an end portion of one of the first horizontal shafts 32, and a first drive gear 37 is meshed with the first driven gear 36. A first motor 38 is provided in a bottom face of the outer frame 28. The inner frame 29 is rotated by the first motor 38, through the first drive gear 37 and the first driven gear 36.

A first encoder 39 is provided near an end portion of the other of the first horizontal shafts 32. The first encoder 39 detects the rotation angle of the inner frame 29 about the first horizontal shafts 32, 32 with respect to the outer frame 28.

A second driven gear 41 is fitted over a portion at one end of the second horizontal shaft 35. The second drive gear 42 is meshed with the second driven gear 41. A second motor 43 is provided at a side face of the inner frame 29 (the left side face in FIG. 2). The inclination detection unit 33 is rotated by the second motor 43 through the second drive gear 42 and the second driven gear 41.

A second encoder 44 is provided near another end portion of the second horizontal shaft 35. The second encoder 44 detects the rotation angle of the inclination detection unit 33 about the second horizontal shaft 35 with respect to the inner frame 29.

The rotation angles detected by the first encoder 39 and the second encoder 44 are input to an inclination computation processor 45.

The inclination detection unit 33 includes a first inclination sensor 46 and a second inclination sensor 47. The detection signals from the first inclination sensor 46 and the second inclination sensor 47 are input to the inclination computation processor 45.

The first inclination sensor 46 is a sensor that detects the horizontal at high precision and is, for example, an inclination detector that detects the horizontal using changes in the reflection angle of reflected light from detection light made incident on a horizontal liquid surface, or is a bubble tube that detects inclination by changes in position of an encapsulated bubble. Moreover, the second inclination sensor 47 is a sensor that detects inclination changes with high responsiveness, such as, for example, an acceleration sensor.

Note that the first inclination sensor 46 and the second inclination sensor 47 are both capable of individually detecting inclination in two axial directions, these being the rotation direction (inclination direction) detected by the first encoder 39 and the rotation direction (inclination direction) detected by the second encoder 44.

The inclination computation processor 45 computes the inclination angle and inclination direction on the basis of detection results from the first inclination sensor 46 and the second inclination sensor 47. The inclination computation processor 45 also computes the rotation angle of the first encoder 39 and the rotation angle of the second encoder 44 that correspond to the inclination angle and inclination direction. The computation results of the first encoder 39 and the second encoder 44 are input to the computation controller 9.

Note that the orientation detection device 8 is set such that the first inclination sensor 46 detects the horizontal in cases in which the outer frame 28 is placed horizontally, and is also set such that the output of the first encoder 39 and the output of the second encoder 44 together indicate a reference position (rotation angle of 0°).

A description follows regarding operation of the orientation detection device 8.

First, a description follows regarding a case in which inclination is detected with high precision. Cases in which inclination is detected with high precision include, for example, cases in which the orientation detection device 8 is provided on a fixed measurement device, and cases not demanding responsiveness.

When the orientation detection device 8 is inclined, the first inclination sensor 46 outputs a signal according to the inclination.

The inclination computation processor 45 computes an inclination angle and inclination direction on the basis of the signal from the first inclination sensor 46. On the basis of the computation result, the inclination computation processor 45 then also computes rotation amounts of the first motor 38 and the second motor 43 in order to zero the inclination angle and inclination direction, and issues a drive command to rotationally drive the first motor 38 and the second motor 43 by these rotation amounts.

The first motor 38 and the second motor 43 are driven so that the orientation detection device 8 is inclined counter to the computed inclination angle and inclination direction. The motor drive amounts (rotation angles) are detected by the first encoder 39 and the second encoder 44, and driving of the first motor 38 and the second motor 43 is stopped when the rotation angles detected by the first encoder 39 and the second encoder 44 have become the computation result.

Moreover, the rotations of the first motor 38 and the second motor 43 are finely adjusted such that the first inclination sensor 46 detects the horizontal.

In this state, the inner frame 29 and the inclination detection unit 33 are controlled to be horizontal while the outer frame 28 is in an inclined state.

Thus, to make the inclination detection unit 33 horizontal, the inclination angle and inclination direction of the inner frame 29 and the inclination detection unit 33, inclined by the first motor 38 and the second motor 43, are found on the basis of the rotation angles detected by the first encoder 39 and the second encoder 44.

The inclination computation processor 45 computes the inclination angle and inclination direction of the orientation detection device 8 on the basis of the detection results of the first encoder 39 and the second encoder 44 when the first inclination sensor 46 has detected the horizontal. This computation result indicates the orientation of the orientation detection device 8 after inclination.

The inclination computation processor 45 outputs the computed inclination angle and inclination direction to the computation controller 9 as a detection signal of the orientation detection device 8.

Next, a description follows regarding operation of the orientation detection device 8 in cases in which the orientation detection device 8 is installed in a portable instrument, and data is acquired in a portable state.

In a portable state, the orientation of the orientation detection device 8 changes every moment. Orientation detection is accordingly performed on the basis of the detection results of the highly responsive second inclination sensor 47.

The horizontal state is first detected using the first inclination sensor 46, changes in orientation are then found using the highly responsive second inclination sensor 47, and then orientation is detected on the basis of the detection results from the second inclination sensor 47. This control enables the inclination angle and inclination direction of the orientation detection device 8 to be detected in real time.

Moreover, the inclination detection unit 33 together with the inner frame 29 are also able to rotate through 360° or greater without restriction in the rotation of the inclination detection unit 33 and the inner frame 29. Namely, orientation detection can be made in all directions regardless of the orientation of the orientation detection device 8 (for example, even in cases in which the orientation detection device 8 has been inverted top-to-bottom).

Orientation detection is accordingly possible over a wide range and in all orientations without restriction in the measurement range of the inclination sensor.

The orientation is detected on the basis of the detection results of the second inclination sensor 47 in cases demanding high responsiveness. However, the second inclination sensor 47 generally has inferior detection precision to that of the first inclination sensor 46.

Both the high precision first inclination sensor 46 and the highly responsive second inclination sensor 47 are installed, and the detection result by the second inclination sensor 47 is calibrated using the detection result of the first inclination sensor 46. This thereby enables a high precision of orientation detection on the basis of the detection results of the second inclination sensor 47 alone.

Moreover, the motors are driven on the basis of the inclination angle detected by the second inclination sensor 47 such that the inclination angle is zeroed. Driving of the first motor 38 and the second motor 43 is also continued until the first inclination sensor 46 detects the horizontal. If a deviation arises between the value of the encoder when the first inclination sensor 46 has detected the horizontal, which is an actual inclination angle, and the inclination angle detected by the second inclination sensor 47, then the inclination angle of the second inclination sensor 47 can be calibrated on the basis of this deviation.

Thus, the inclination angle detected by the second inclination sensor 47 can be calibrated (corrected) by relationships, which is acquired in advance, between detected inclination angles of the second inclination sensor 47 and the inclination angles found on the basis of horizontal detection by the first inclination sensor 46 and encoder detection results. This enables the precision in the highly responsiveness orientation detection by the second inclination sensor 47 to be improved.

Moreover, when there is a large fluctuation in inclination or when there is a rapid change in inclination, the computation controller 9 controls the first motor 38 and the second motor 43 on the basis of signals from the second inclination sensor 47. Moreover, when there is a small fluctuation in inclination or when there is a gradual change in inclination, namely, when the first inclination sensor 46 is in a state capable of keeping up with a fluctuation in inclination or a change in inclination, the computation controller 9 controls the first motor 38 and the second motor 43 on the basis of signals from the first inclination sensor 46.

Note that comparison data, this being a data table representing comparison results between detection results of the first inclination sensor 46 and detection results of the second inclination sensor 47, is stored in the storage unit of the computation controller 9. In cases in which the first motor 38 and the second motor 43 are controlled on the basis of signals from the second inclination sensor 47, the computation controller 9 calibrates the detection results from the second inclination sensor 47 on the basis of the comparison data. The precision of detection results by the second inclination sensor 47 can be raised to the detection precision of the first inclination sensor 46 by performing such calibration. Thus, high responsiveness can be implemented in the inclination detection by the orientation detection device 8, while high precision thereof is maintained.

The inclination angle and inclination direction are computed by combining the computed rotation angle of the first encoder 39 and the rotation angle of the second encoder 44. The inclination angle and inclination direction correspond to the inclination angle and inclination direction with respect to the vertical of the measurement device 1 to which the orientation detection device 8 is attached.

Figure 3:
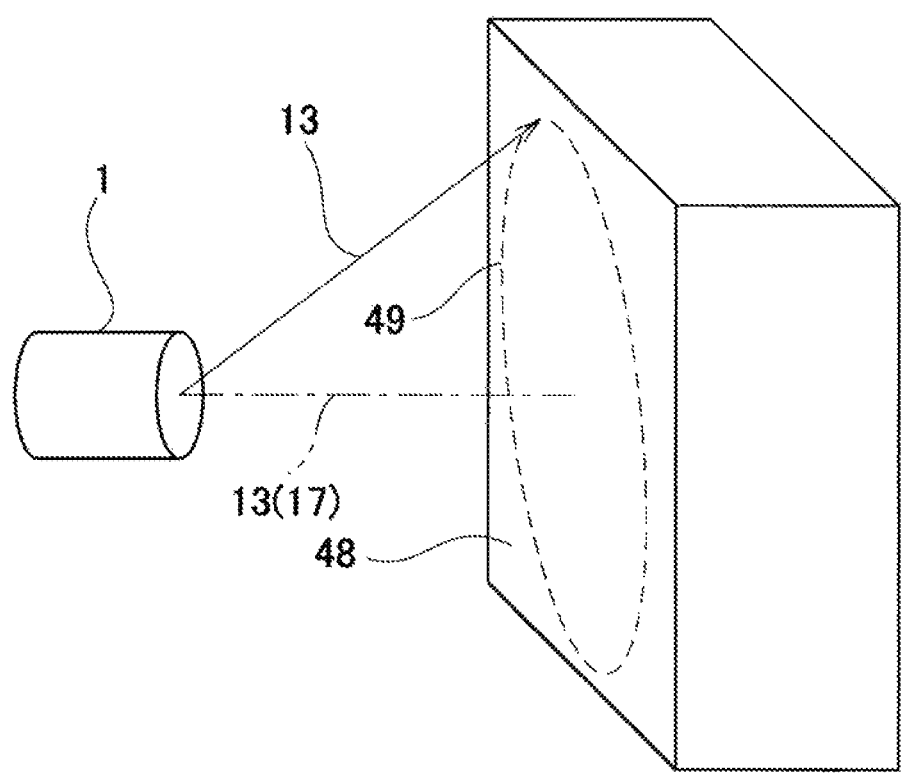
FIG. 3 is an explanatory diagram illustrating inclination measurement employing the measurement device.
Figure 4:
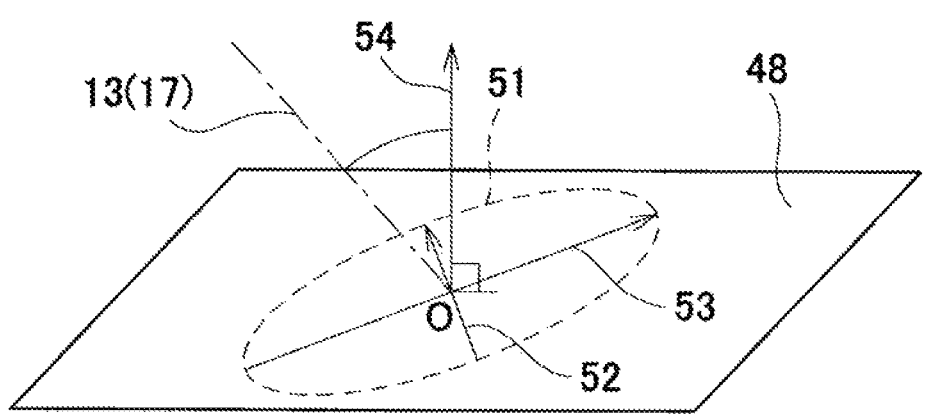
FIG. 4 is an explanatory diagram illustrating inclination measurement employing the measurement device.

Next, a description follows regarding inclination measurement of a measurement target object surface 48 using the measurement device 1, with reference to FIG. 3 and FIG. 4. Note that the measurement target object surface 48 is a flat surface.

In a state in which the measurement device 1 has been pointed toward the measurement target object surface 48, the rangefinding light is shone while the wedge prism 22 is rotated. When the rangefinding light is being shone while rotated in a circular shape, the distance between the measurement device 1 and the measurement target object surface 48 is adjusted such that the whole of a path 49 of the rangefinding light is positioned on the measurement target object surface 48. The diameter of the path 49 on the measurement target object surface 48 is preferably as large as possible.

Rangefinding data is acquired by the rangefinding unit 4 for measurement points on the path 49 (a point group) for which rangefinding is performed at predetermined scan intervals. On the basis of the rangefinding data for the measurement points and the rotation angle of the wedge prism 22 when rangefinding, the computation controller 9 computes three-dimensional coordinate data on the path 49 with reference to the measurement device 1.

The computation controller 9 performs such ellipse-fitting using, for example, a least squares method, on the basis of the computed coordinate data, as illustrated in FIG. 4. In the present embodiment, the definition of an ellipse also encompasses a circle.

The computation controller 9 computes a minor axis vector 52 and a major axis vector 53 of an ellipse 51 fitted to the coordinate data, and finds an intersection point O of the minor axis vector 52 and the major axis vector 53. The computation controller 9 also computes a normal line vector 54 at the intersection point on the basis of the vector product between the minor axis vector 52 and the major axis vector 53.

The inclination angle and inclination direction of the measurement target object surface 48 with respect to the measurement device 1 is measured by computing the inclination angle and inclination direction of the normal line vector 54 with respect to the rotation axial center of the wedge prism 22, namely, the reception light optical axis 17 (the emission optical axis 13).

The inclination angle and inclination direction of the measurement device 1 with respect to the horizontal or the vertical is detected by the orientation detection device 8.

The computation controller 9 accordingly computes the inclination angle and inclination direction of the measurement target object surface 48 with respect to the horizontal on the basis of the inclination angle and inclination direction of the measurement target object surface 48 with respect to the measurement device 1 and on the basis of the inclination angle and inclination direction of the measurement device 1 with respect to the horizontal or the vertical. This completes measurement of the inclination of the measurement target object surface 48. The inclination is measured with respect to the vertical when measuring the inclination of a wall face or the like using the measurement device 1. The inclination is measured with respect to the horizontal when measuring the inclination of a ceiling or the like.

As described above, in the first embodiment, merely pointing the measurement device 1 toward the measurement target object surface 48, and adjusting the distance between the measurement device 1 and the measurement target object surface 48 such that the whole of the path 49 of the rangefinding light is positioned on the measurement target object surface 48, suffices. Three-dimensional coordinate data on the path 49 is acquired, and the inclination of the measurement target object surface 48 with respect to the measurement device 1 can then be measured on the basis of the coordinate data.

Complicated processing such as post processing steps after acquiring the coordinate data can thereby be eliminated, enabling measurement of the inclination of the measurement target object surface 48 to be performed in a short period of time. Employing only a single distance meter (the rangefinding unit 4) also suffices, enabling device configuration to be simplified, and a reduction in manufacturing cost to be achieved.

Alternatively, the measurement target object surface 28 is scanned with the rangefinding light at high speed through the wedge prism 22, and measurement of the inclination of the measurement target object surface 48 is performed each time one cycle's worth of the coordinate data is acquired on the path 49, namely, in a short period of time. Thus, due to being able to measure the inclination of the measurement target object surface 48 onsite, without any post processing, application can be made to various surveying applications, such as civil engineering surveying, interior surveying, equipment installation, and the like. A shortening of the operation time can also be achieved.

Moreover, due to executing inclination measurement continuously in a short period of time, even if the inclination state of the measurement target object surface 48 changes every moment, the measurement device 1 is capable of keeping up with the changes in the inclination state, and can measure the inclination of the measurement target object surface 48.

The inclination of the measurement target object surface 48 with respect to the measurement device 1 is measured by ellipse-fitting employing all coordinate data acquired for one cycle, and finding the normal line vector 54 on the basis of the fitted ellipse. Error in measurement values at each of the measurement points are averaged out by employing measurement values at many measurement points during ellipse-fitting. Highly accurate ellipse-fitting is accordingly possible, enabling the precision of inclination measurement to be improved.

Moreover, the measurement device 1 includes the orientation detection device 8, enabling measurement of the inclination of the measurement device 1 with respect to the horizontal or the vertical. This accordingly enables measurement of the inclination of the measurement target object surface 48 with respect to the horizontal or the vertical, even in cases in which the orientation of the measurement device 1 is not stable, such as when inclination measurement is being performed while the measurement device 1 is being held in the hand by an operative. The operability for inclination measurement can accordingly be improved.

Figure 5:
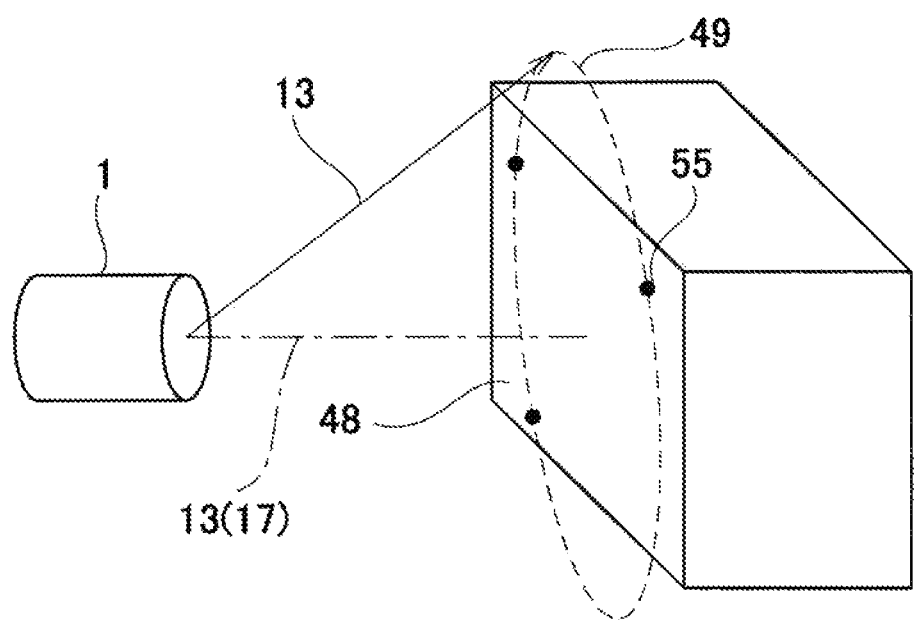
FIG. 5 is an explanatory diagram illustrating a modified example of inclination measurement employing the measurement device.
Figure 6:
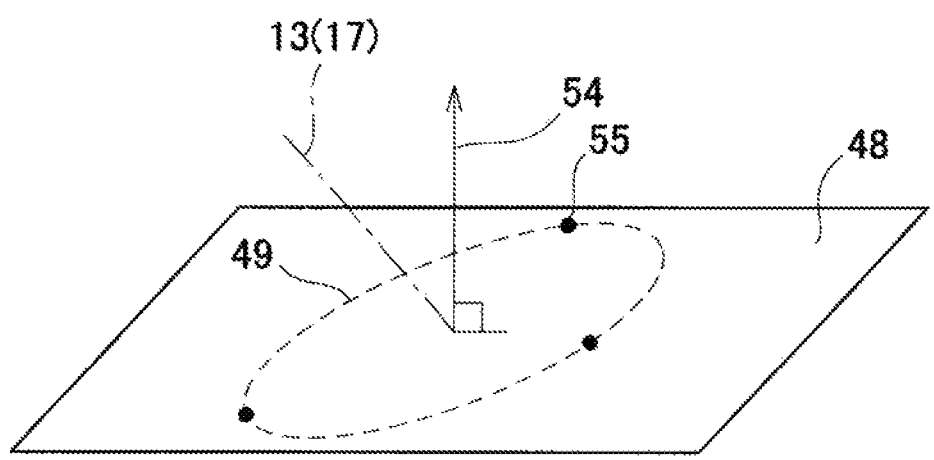
FIG. 6 is an explanatory diagram illustrating a modified example of inclination measurement employing the measurement device.

FIG. 5 and FIG. 6 illustrate a modified example of the first embodiment.

In this modified example, at least three measurement points 55 are selected from out of the coordinate data obtained on the path 49 of the rangefinding light being shone on the measurement target object surface 48. The inclination angle and inclination direction of the measurement target object surface 48 with respect to the reception light optical axis 17 are then computed on the basis of the measurement values of the selected measurement points 55, and the normal line vector 54 at the intersection point of the reception light optical axis 17 and the measurement target object surface 48 is computed. Moreover, the inclination of the measurement target object surface 48 with respect to the measurement device 1, and the inclination of the measurement target object surface 48 with respect to the horizontal or the vertical is measured on the basis of the normal line vector 54.

In the modified example described above, adjustment does not need to be made to the position of the measurement device 1 and the measurement target object surface 48, because the whole of the path 49 does not need to be positioned on the measurement target object surface 48. The operability for inclination measurement can accordingly be improved.

Figure 7:
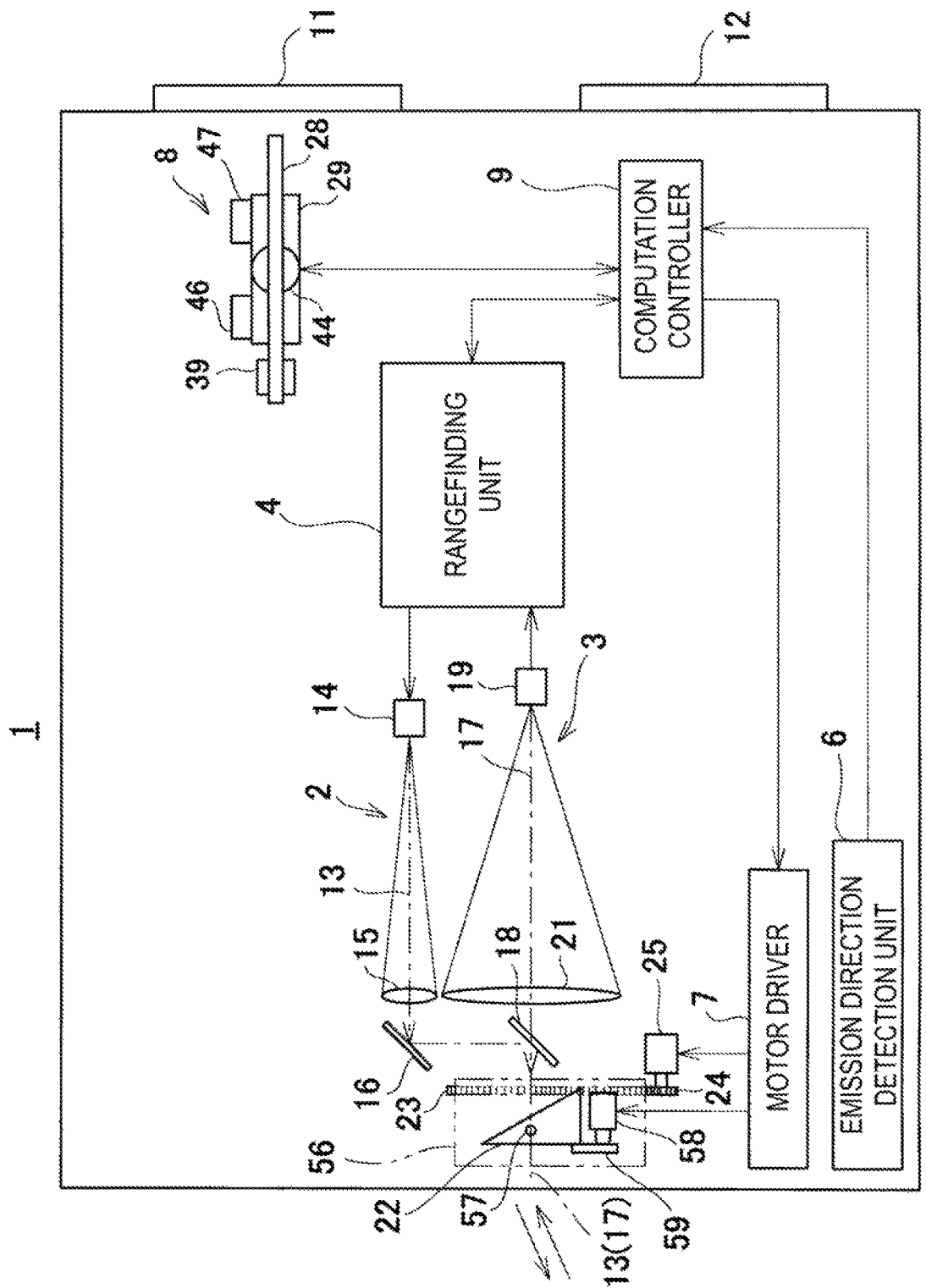
FIG. 7 is a schematic diagram illustrating an optical system of a measurement device according to a second embodiment of the invention.

Next, a description follows regarding a measurement device 1 according to a second embodiment of the invention, with reference to FIG. 7. Note that the same reference signs are appended in FIG. 7 to equivalent parts to those of FIG. 1, and description thereof is omitted.

In the second embodiment, the wedge prism 22 is rotatably provided through a rotation shaft 57, and the wedge prism 22 can be tilted about the rotation shaft 57 by a tilt member 59 using a deflection angle adjustment motor 58. The wedge prism 22, the deflection angle adjustment motor 58, and the like are also unitized together as an optical axis deflection section 56. The optical axis deflection section 56 is rotated about the reception light optical axis 17 (the deflected emission optical axis 13) by the motor 25. The rotation shaft 57 has a central axis perpendicular to the plane of FIG. 7. The central axis is orthogonal to the rotation axial center (namely, the emission optical axis 13) of the wedge prism 22 rotated by the motor 25.

The deflection angle adjustment motor 58 is, for example, a linear ultrasonic motor. The deflection angle adjustment motor 58 is electrically connected to the motor driver 7 and driving is controlled by the motor driver 7. Note that a rotation motor may be coupled to the rotation shaft 57 such that the wedge prism 22 is rotated through the rotation shaft 57.

The wedge prism 22 is rotated through the rotation shaft 57 by the deflection angle adjustment motor 58 being driven, and the optical axis of the wedge prism 22 is inclined with respect to the emission optical axis 13. The angle of deflection (deflection angle) of the wedge prism 22 is adjusted by inclining the wedge prism 22 with respect to the emission optical axis 13.

The incident state of the rangefinding light onto the wedge prism 22 is changed by rotating the optical axis deflection section 56 using the motor 25, changing the deflection angle of the rangefinding light with respect to the emission optical axis 13. Namely, the diameter of the path 49 of the rangefinding light shone onto the measurement target object surface 48 is changed by the deflection angle adjustment motor 58 being driven.

The emission direction detection unit 6 detects the drive amount of the deflection angle adjustment motor 58, computes the angle of deflection, and detects the rotation amount of the motor 25. The emission direction detection unit 6 computes the deflection angle and emission direction of the rangefinding light on the basis of the rotational position of the optical axis deflection section 56 and the rotational position of the wedge prism 22 about the rotation shaft 57.

In the second embodiment, the wedge prism 22 and the deflection angle adjustment motor 58 are unitized as the optical axis deflection section 56, and the optical axis deflection section 56 is inclined with respect to the emission optical axis 13, thereby enabling the deflection angle and emission direction of the rangefinding light to be varied.

Thus, because the deflection angle of the emission optical axis 13, namely, the diameter of the path 49, can be varied, the whole of the path 49 can be positioned on the measurement target object surface 48 without adjusting the distance between the measurement device 1 and the measurement target object surface 48. This thereby enables the measurement precision and the operability to be improved.

The diameter of the path 49 on the measurement target object surface 48 is preferably as large as possible because this improves the surface accuracy computed.

Thus, the deflection angle adjustment motor 58 is preferably driven to adjust the deflection angle such that the whole of the path 49 is positioned on the measurement target object surface 48 and the diameter of the path 49 is the maximized. The driving of the deflection angle adjustment motor 58 may be performed manually by an operative, or may be performed automatically by the computation controller 9.

In cases in which the driving of the deflection angle adjustment motor 58 is performed automatically by the computation controller 9, for example, the deflection angle of the rangefinding light (the diameter of the path 49) may be gradually increased every cycle, and the coordinate data at the deflection angle just before measurement results ceases to be obtained for the measurement target object surface 48 (just before the path 49 becomes discontinuous) may be employed.

Alternatively, the deflection angle of the rangefinding light may be gradually decreased every cycle, and the coordinate data at the deflection angle at the point in time when measurement results are obtained for one whole cycle on the measurement target object surface 48 (one cycle's worth of the path 49) may be employed.

Figure 8:
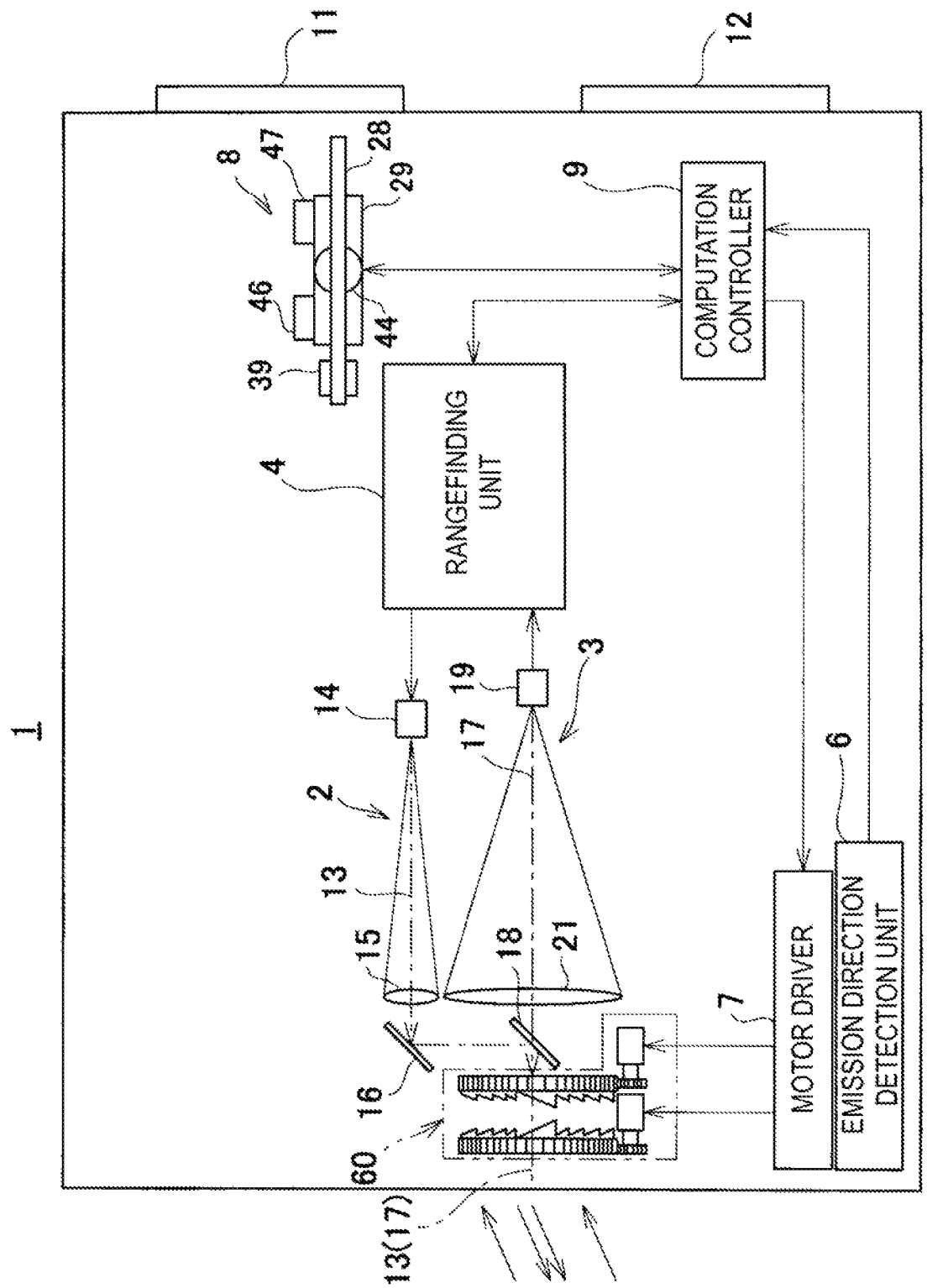
FIG. 8 is a schematic diagram illustrating an optical system of a measurement device according to a third embodiment of the invention.
Figure 9:
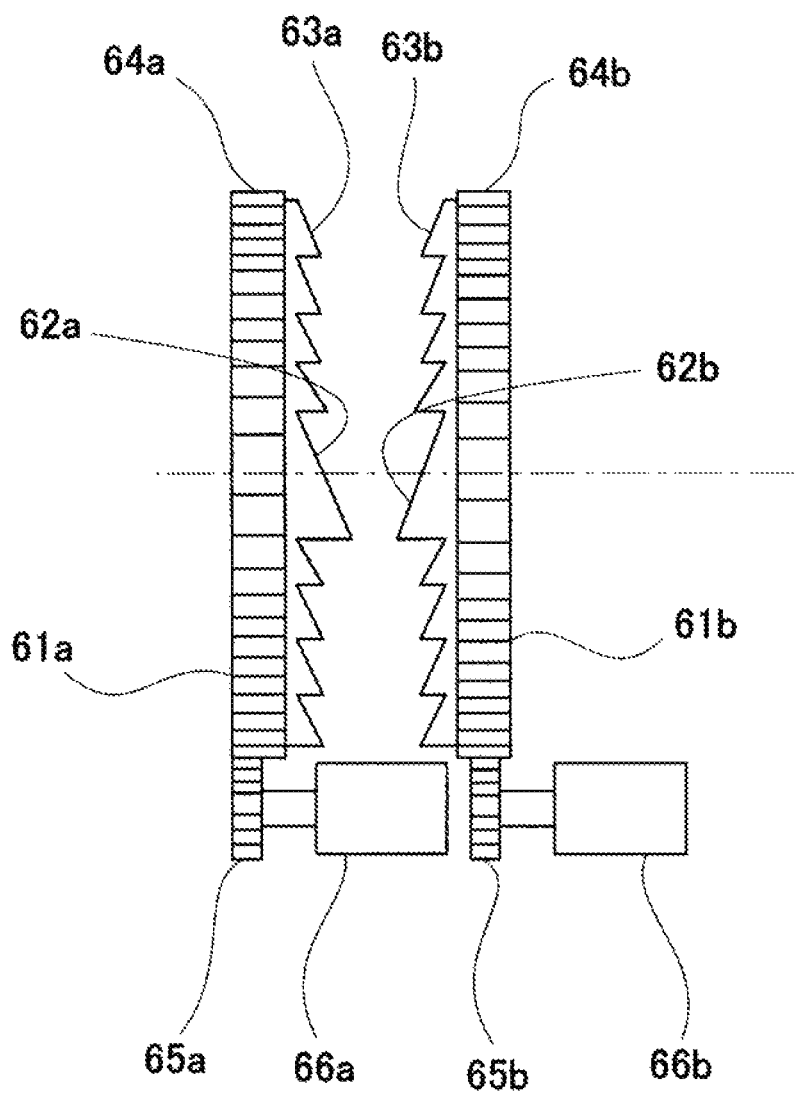
FIG. 9 is an expanded view of an optical axis deflection section of the optical system.

Next, a description follows regarding a third embodiment of the invention, with reference to FIG. 8 and FIG. 9. Note that the same reference signs are appended in FIG. 8 to equivalent parts to those of FIG. 1, and description thereof is omitted.

In the third embodiment, an optical axis deflection section includes a pair of optical prisms 61a, 61b.

The optical prisms 61a, 61b are each circular disk shaped, and are disposed on the reception light optical axis 17, orthogonal to the reception light optical axis 17. The optical prisms 61a, 61b are superimposed on each other and are disposed parallel to each other. A Fresnel prism is employed as each of the optical prisms 61a, 61b because this is preferable in order to make a more compact device.

Central portions of the optical prisms 61a, 61b serve as a rangefinding light axis deflection section, the rangefinding light axis deflection section being a first optical axis deflection section through which rangefinding light passes. Portions of the optical prisms 61a, 61b other than the central portions serve as a reflected rangefinding light axis deflection section, the reflected rangefinding light axis deflection section being a second optical axis deflection section through which reflected rangefinding light passes.

The Fresnel prisms employed as the optical prisms 61a, 61b each have a plate shaped profile. The optical prisms 61a, 61b are configured by prism elements 62a, 62b disposed parallel to each other and by multiple prism elements 63a, 63b. Each of the prism elements 62a, 62b and the prism elements 63a, 63b have the same optical properties.

The prism elements 62a, 62b configure the rangefinding light axis deflection section, and the prism elements 63a, 63b configure the reflected rangefinding light axis deflection section.

The Fresnel prisms may be manufactured from optical glass, or may be molded from an optical plastic material. Cheap Fresnel prisms can be manufactured in the case in which the Fresnel prisms are molded from an optical plastic material.

The optical prisms 61a, 61b are each disposed so as to be independently and individually rotatable about the reception light optical axis 17. The optical prisms 61a, 61b are independently controlled in terms of rotation direction, rotation amount, and rotation speed. This enables the emission optical axis 13 of the rangefinding light being emitted to be deflected in an optional direction, and the reception light optical axis 17 of the reflected rangefinding light received to be deflected so as to be parallel to the emission optical axis 13.

Each of the external profiles of the optical prisms 61a, 61b is a circular shape centered on the reception light optical axis 17. The diameters of the optical prisms 61a, 61b are set so as to enable sufficient quality of light to be acquired in consideration of the spread of the reflected rangefinding light.

A ring gear 64a is fitted over the outer circumference of the optical prism 61a, and a ring gear 64b is fitted over the outer circumference of the optical prism 61b.

A drive gear 65a is meshed with the ring gear 64a, and the drive gear 65a is fixed to an output shaft of a motor 66a. Similarly, a drive gear 65b is meshed with the ring gear 64b, and the drive gear 65b is fixed to an output shaft of a motor 66b. The motors 66a, 66b are electrically connected to the motor driver 7.

The drive gears 65a, 65b and the motors 66a, 66b are disposed at positions that do not interfere with the rangefinding light emitting section 2, such as below the ring gears 64a, 64b.

Motors capable of detecting the rotation angle, or motors that rotate according to a drive input value, for example pulse motors, are employed as the motors 66a, 66b. Alternatively, a rotation angle detector that detects a rotation amount (rotation angle) of the motor, such as an encoder, may be employed, to detect the rotation amount of the motor. The rotation amounts of the motors 66a, 66b are detected, and the motors 66a, 66b are individually controlled by the motor driver 7.

The emission direction detection unit 6 computes the rotational positions of the optical prisms 61a, 61b on the basis of the detected rotation amounts of the motors 66a, 66b. Moreover, the emission direction detection unit 6 computes the deflection angle and emission direction of the rangefinding light on the basis of the refractive indexes and rotational positions of the optical prisms 61a, 61b, and the computation results are input to the computation controller 9. Note that the rangefinding light is deflected over a range of, for example, from 0 to 20° by the optical prism 61a and the optical prism 61b working in concert with each other.

The projection lens 15, the rangefinding light axis deflection section, and the like configure a projection light optical system, and the reflected rangefinding light axis deflection section, the imaging lens 21, and the like configure a reception light optical system. The optical prisms 61a, 61b, the motors 66a, 66b, and the like configure an optical axis deflection unit 60.

The rangefinding light emitted from the light emitting element 14 is collimated into a parallel beam by the projection lens 15, deflected in a required direction by the prism elements 62a, 62b, and shone on the measurement target object surface 48 or the like.

The reflected rangefinding light reflected by the measurement target object surface 48 or the like is deflected by the prism elements 63a, 63b and focused onto the light receiving element 19 by the imaging lens 21.

The rangefinding light being shone can be directed in an optional deflection direction and deflection angle over a range of ±20° by combination of the rotational positions of the optical prism 61a and the optical prism 61b. Moreover, in a fixed state of the positional relationship between the optical prism 61a and the optical prism 61b (in a fixed state of the deflection angle obtained by the optical prism 61a and the optical prism 61b), the path drawn by the rangefinding light passing through the prism elements 62a, 62b is a circle centered on the emission optical axis 13 due to the optical prism 61a and the optical prism 61b being rotated together as one by the motors 66a, 66b.

Figure 10:
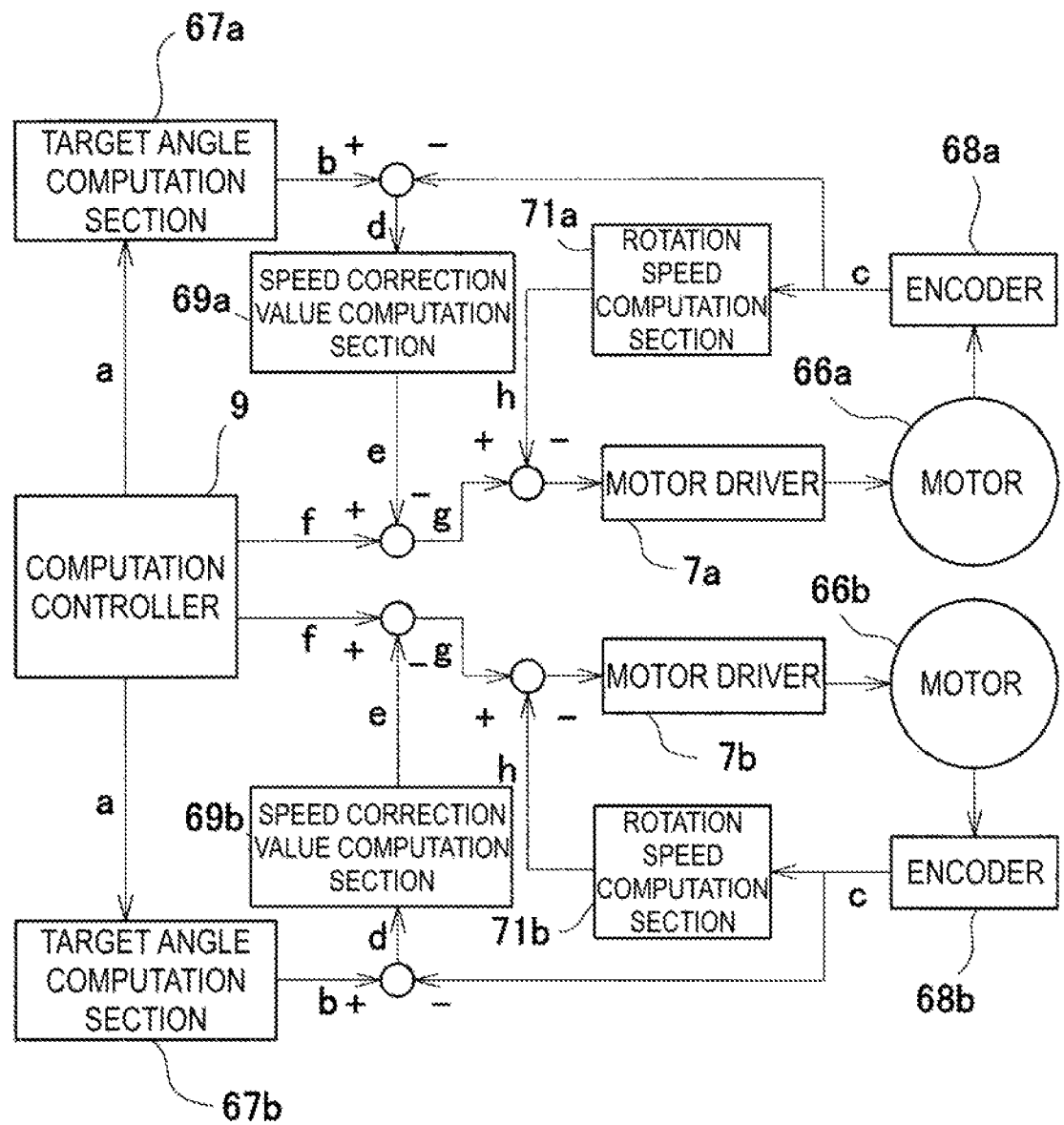
FIG. 10 is an explanatory diagram illustrating control of a motor in the optical axis deflection section of the measurement device.

A description follows regarding control of the motors 66a, 66b to rotate the optical prism 61a and the optical prism 61b together as one, with reference to FIG. 10. Note that similar control is executed on the motor 66a and the motor 66b, and so a description follows regarding control of the motor 66a.

The computation controller 9 drives the motor 66a at a predetermined speed. After starting driving of the motor 66a, an elapsed time (signal a) is sent to a target angle computation section 67a at intervals of a predetermined duration.

On the basis of the elapsed time received from the computation controller 9, the target angle computation section 67a computes a target rotation angle for the motor 66a that should be rotating when the predetermined duration has elapsed, and outputs the target rotation angle (signal b). At the same time, an encoder 68a detects the actual rotation angle of the motor 66a when the predetermined duration has elapsed, and outputs the actual rotation angle (signal c).

The difference between the target rotation angle (signal b) and the actual rotation angle (signal c) is computed, and this difference (signal d) is input to a speed correction value computation section 69a. The speed correction value computation section 69a computes a speed correction value on the basis of the difference in rotation angles, and outputs the speed correction value (signal e). The speed correction value is a correction value for increasing the rotation speed of the motor 66a when the actual rotation angle is less than the target rotation angle, or for decreasing the rotation speed of the motor 66a when the actual rotation angle is greater than the target rotation angle.

A target rotation speed of the motor 66a (signal f) is output from the computation controller 9. The speed correction value is added to or subtracted from the target rotation speed, and the corrected target rotation speed (signal g) is output. Alternatively, the actual rotation angle (signal c) is also input to a rotation speed computation section 71a, and the rotation speed computation section 71a computes the actual rotation speed from the actual rotation angle, and outputs the actual rotation speed (signal h).

A motor driver 7a controls the rotation speed of the motor 66a so as to rotate the motor 66a at the corrected target rotation speed on the basis of the corrected target rotation speed (signal g) and the actual rotation speed (signal h). The speed correction value (signal e) gradually approaches zero as rotation speed control of the motor 66a continues, and the corrected target rotation speed (signal g) gradually approaches the target rotation speed (signal f), such that the motor 66a implements constant speed rotation at the target rotation speed of the motor 66a.

Control similar to that described above is also performed on the motor 66b, so that the motor 66b implements constant speed rotation at the target rotation speed of the motor 66b. The motor 66a and the motor 66b are accordingly rotated together as one at the constant speed, enabling the optical prism 61a and the optical prism 61b to be rotated together as one.

Note that the speed correction value may be computed on the basis of the difference between the actual rotation angle of the motor 66a detected by the encoder 68a and the actual rotation angle of the motor 66b detected by the encoder 68b, rather than being computed on the basis of the difference between the target rotation angle and the actual rotation angle. In such cases, a corrected target rotation speed is then computed therefrom to control the motor 66a and the motor 66b in synchronization with each other.

Similarly to as described above, in the third embodiment, the rangefinding light is shone in a circular path by rotating the optical prisms 61a, 61b together as one at the constant speed while causing a laser beam (rangefinding light) to be emitted by the light emitting element 14.

This enables the measurement target object surface 48 (see FIG. 3) to be scanned with the rangefinding light along a circular shaped path 49 (see FIG. 3), enabling the inclination of the measurement target object surface 48 with respect to the measurement device 1, and the inclination of the measurement target object surface 48 with respect to the horizontal or the vertical, to be measured.

Moreover, by varying the rotational position relationship between the optical prism 61a and the optical prism 61b, the deflection angle of the rangefinding light, namely, the diameter of the circular path of the path 49, can be varied. This enables the whole of the path 49 to be positioned on the measurement target object surface 48 irrespective of the size of the measurement target object surface 48 and irrespective of the distance to the measurement target object surface 48. The operability can accordingly be improved.

Note that although FIG. 10 illustrates the target angle computation sections 67a, 67b, the speed correction value computation sections 69a, 69b, and the rotation speed computation sections 71a, 71b as being configured independent of each other, the target angle computation sections 67a, 67b, the speed correction value computation sections 69a, 69b, and the rotation speed computation sections 71a, 71b are actually part of the computation controller 9.

Figure 11:
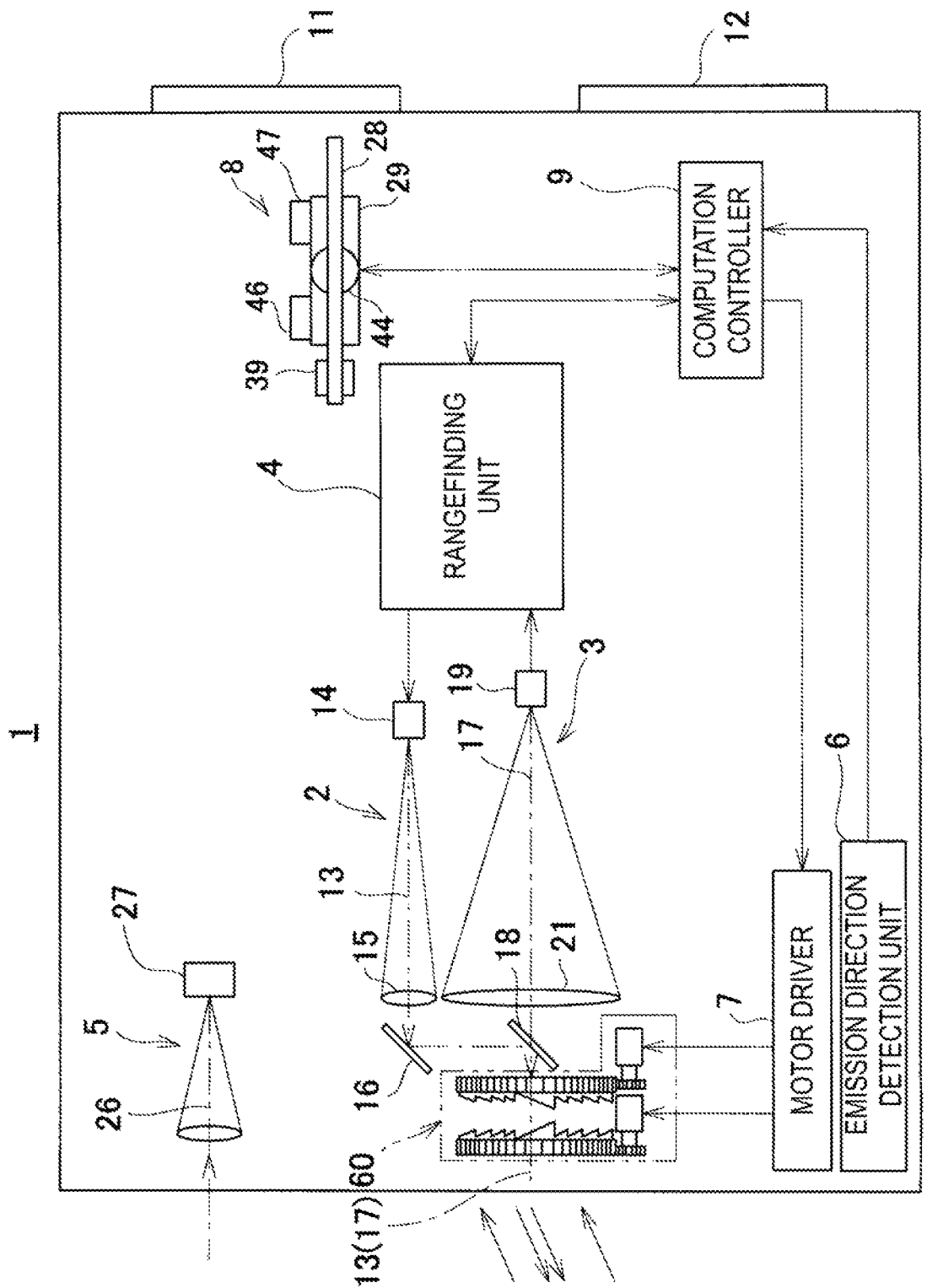
FIG. 11 is a schematic diagram illustrating an optical system of a measurement device according to a fourth embodiment of the invention.

Next, a description follows regarding a fourth embodiment of the invention, with reference to FIG. 11. Note that the same reference signs are appended in FIG. 11 to equivalent parts to those of FIG. 1, and description thereof is omitted.

The fourth embodiment is configured by providing an imaging section 5 to a measurement device according to the third embodiment.

The imaging section 5 is a camera having an angle of view of 50°, for example. The imaging section 5 acquires image data including a measurement target object. The imaging section 5 has an imaging optical axis 26 extending in a horizontal direction when the measurement device 1 is in a horizontal orientation. The imaging section 5 is set such that the imaging optical axis 26 is parallel to the emission optical axis 13 and the reception light optical axis 17. The distance between the imaging optical axis 26 and the reception light optical axis 17 is known.

An imaging element 27 of the imaging section 5 is a CCD or a CMOS sensor, which are assemblies of pixels, configured such that the position of each of the pixels can be identified on the imaging element. For example, the position of each of the pixels is identified in a coordinate system having the imaging optical axis 26 at the origin.

Due to provision of the imaging section 5, whether or not the whole of the path 49 (see FIG. 3) is positioned on the measurement target object surface 48 (see FIG. 3) can be determined by images. Thus, even in situations where it is difficult to see, such as when the distance to the measurement target object surface 48 is far, or the measurement target object surface 48 is small, accurate determination can be made as to whether or not the whole of the path 49 is positioned on the measurement target object surface 48.

Note that the diameter of path 49 formed can be found by computation. Thus, by acquiring an image including the path 49, distances in an image can be converted into actual measured values on the basis of the diameter of the path 49 in the image and the computed diameter of the path 49. For example, in the case in which an image including both a measurement target object, such as a crack formed on the measurement target object surface 48, and the path 49 is acquired, the actual length of the crack can be measured on the basis of an actual measured value of the path 49 from conversion.

The inclination of the measurement target object surface 48 with respect to the measurement device 1 can be measured on the basis of the measurement results of coordinate data on the path 49. An image in which the inclination has been corrected can accordingly be acquired even in cases in which the measurement device 1 is inclined with respect to the measurement target object surface 48.

In the fourth embodiment, the measurement device 1 may be attached to a flying body such as a UAV. The measurement target object surface 48 is rotationally scanned with the rangefinding light so that the rangefinding light rotates at least once each time the imaging section 5 acquires an image, namely, at acquisition time intervals, and, for example, measurement of the inclination of the measurement target object surface 48 with respect to the measurement device 1 is executed every frame. This enables all the images acquired by the imaging section 5 to be images having inclination information of the measurement target object surface 48 with respect to the measurement device 1. Namely, each of the images can be images in which the inclination is corrected at high precision.

Thus, photographic surveying and tracking can be performed at high precision, irrespective of the orientation of the UAV.

Note that although a description has been given in the fourth embodiment of a case in which the imaging section 5 is provided to the measurement device of the third embodiment, obviously the imaging section 5 may also be provided to the measurement device according to the first embodiment or according to the second embodiment.

Moreover, although a description has been given of cases in the first embodiment to the fourth embodiment in which, for example, an operative holds the measurement device 1 in their hand, and the inclination is measured when the orientation is in an unstable state, application may also be made to cases in which the measurement device 1 is provided to a processing machine or the like and the surface accuracy of a workpiece is measured. The orientation detection device 8 can be omitted in such cases.

Note that although in the first embodiment to the fourth embodiment, ellipse-fitting is performed by a least squares method on the basis of the measurement results of coordinate data on the path 49, and the inclination of the measurement target object surface 48 is measured on the basis of the fitted ellipse, the inclination of the measurement target object surface 48 may be found by another method.

A description follows regarding measurement of the inclination of the measurement target object surface 48 by another method, with reference to FIG. 12A and FIG. 12B to FIG. 15A and FIG. 15B. Note that FIG. 12A, FIG. 13A, FIG. 14A, and FIG. 15A illustrate relationships between the measurement device 1 and the measurement target object surface 48. FIG. 12B, FIG. 13B, FIG. 14B, and FIG. 15B are graphs in which distance data D (measurement results of the measurement device 1) is shown on the vertical axis and a measurement time t is shown on the horizontal axis, with the time when the rangefinding light passes through a measurement reference point 72 (described later) as zero.

Figure 12A:
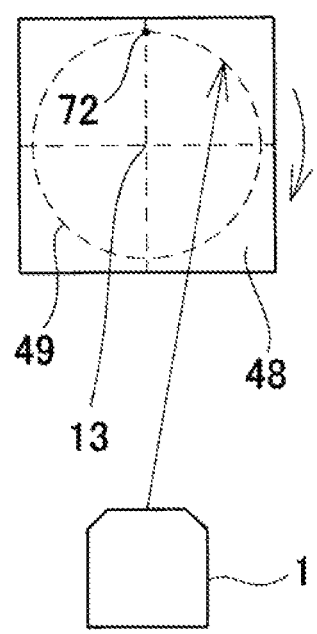
FIG. 12A is an explanatory diagram illustrating a case in which the inclination is measured of a non-inclined measurement target object surface.

As illustrated in the drawings, the measurement device 1 is held horizontal, and the emission optical axis 13 (the reception light optical axis 17) is horizontal. In FIG. 12A, the measurement target object surface 48 is in a vertical state.

When the measurement device 1 scans the measurement target object surface 48 with the rangefinding light in a circular shape centered on the emission optical axis 13, the path of the distance data D, which is the measurement results, is a sine wave 73 where one period of the sine wave 73 is around from the measurement reference point 72 to the measurement reference point 72 (sine waves 73a to 73d in FIG. 12B, FIG. 13B, FIG. 14B, and FIG. 15B).

Note that the measurement reference point 72 is a point where the rangefinding light is shone onto on the path 49 when the rangefinding light has been deflected in a predetermined direction. For example, a point where the rangefinding light is shone onto on the path 49 when the rangefinding light has been deflected vertically upward with respect to the emission optical axis 13, in a state in which the measurement device 1 is held horizontal with respect to the horizontal detected by the orientation detection device 8, is set as the measurement reference point 72. The period of the sine wave 73 is determined by the rotation speed of the motor rotating the optical axis deflection section.

Figure 12B:
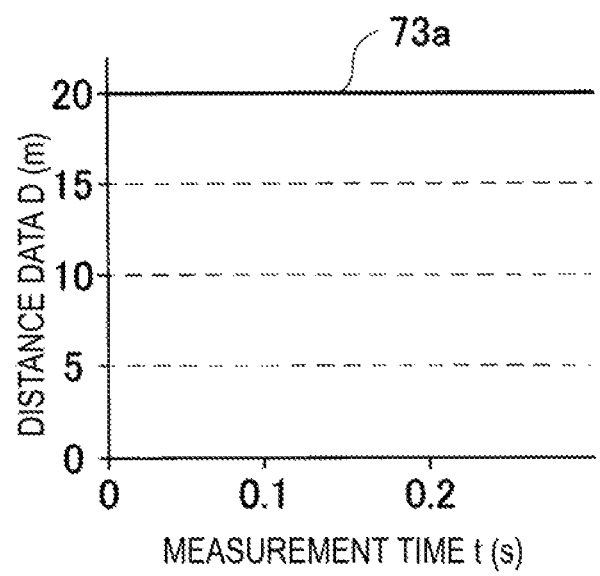
FIG. 12B is a graph illustrating a sine wave in the situation illustrated in FIG. 12A.

FIG. 12A illustrates a non-inclined state of the measurement target object surface 48. The value of distance data D is constant over a complete cycle when the measurement target object surface 48 faces straight toward the measurement device 1. Namely, the sine wave 73a is a sine wave of zero amplitude, i.e. a straight line, as illustrated in FIG. 12B.

Figure 13A:
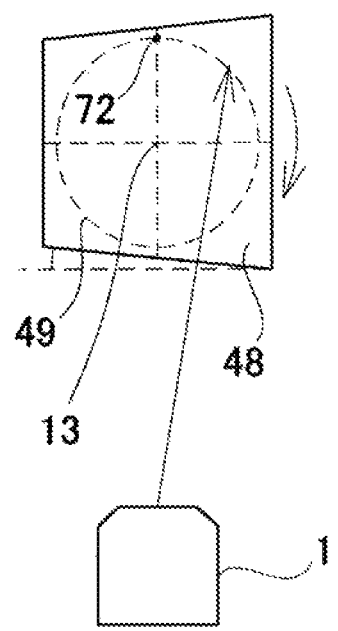
FIG. 13A is an explanatory diagram illustrating a case in which the inclination is measured of an inclined measurement target object surface.
Figure 13B:
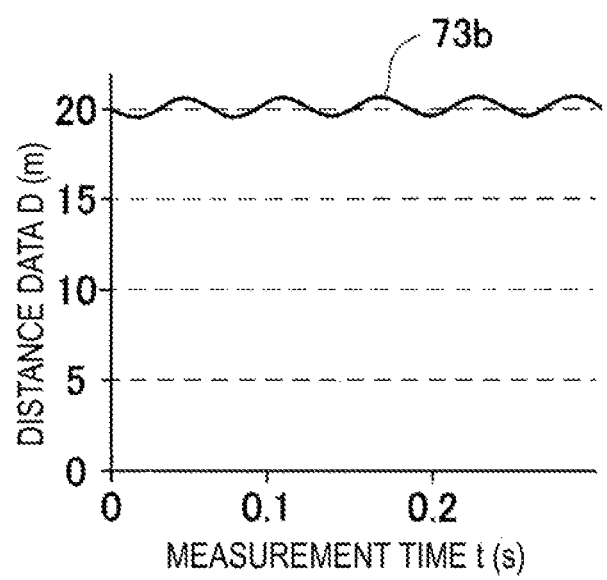
FIG. 13B is a graph illustrating a sine wave in the situation illustrated in FIG. 13A.

FIG. 13A illustrates a case in which the measurement target object surface 48 is inclined about a vertical axis passing through the emission optical axis 13 (a case rotated in a horizontal direction) such that the right edge of the measurement target object surface 48 is at the nearside and the left edge thereof is at the far side. In the rangefinding result, taking the value of the distance data at the measurement reference point 72 as a reference, the values of the distance data at the right side are small, and the values of the distance data on the left side are large. Thus, as illustrated in FIG. 13B, the sine wave 73b is a sine wave in which the difference between the maximum value and the minimum value of the distance data D is the amplitude.

Figure 14A:
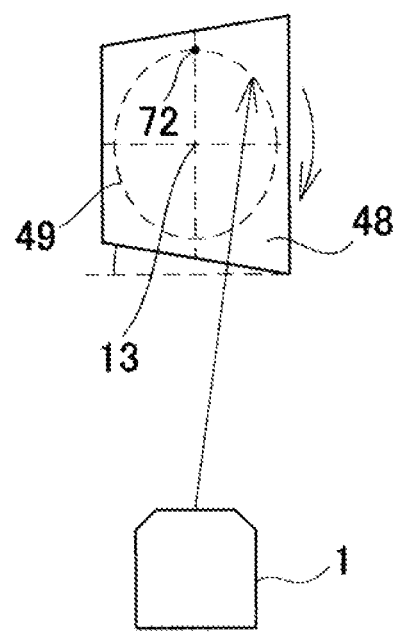
FIG. 14A is an explanatory diagram illustrating a case in which the inclination is measured of an inclined measurement target object surface.
Figure 14B:
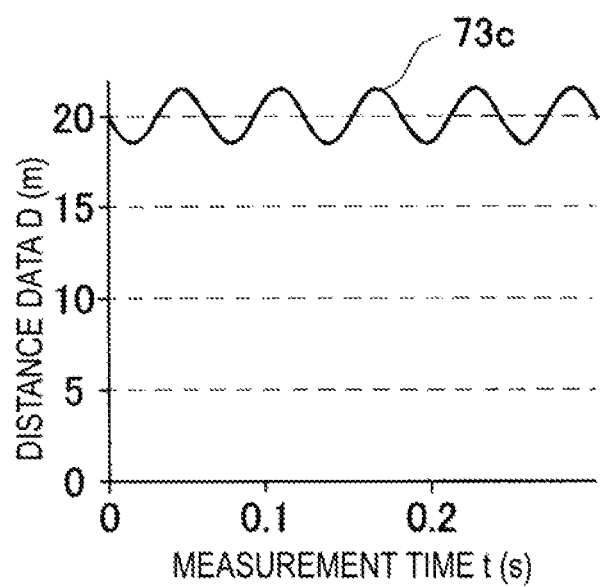
FIG. 14B is a graph illustrating a sine wave in the situation illustrated in FIG. 14A.

FIG. 14A illustrates a case in which the measurement target object surface 48 is inclined in the same direction as in FIG. 13A, but with a larger inclination angle. A comparison of the sine wave 73c illustrated in FIG. 14B and the sine wave 73b indicates that the sine wave 73c is in-phase with the sine wave 73b and has a larger amplitude than an amplitude of the sine wave 73b. The amplitude of the sine wave 73 is accordingly changed by the inclination angle of the measurement target object surface 48. Note that if the measurement target object surface 48 is rotated horizontally in the opposite direction, then the values of the distance data are large on the right side and the values of the distance data are small on the left side, with the sine wave obtained being out of phase with the sine wave 73b by 180°.

Figure 15A:
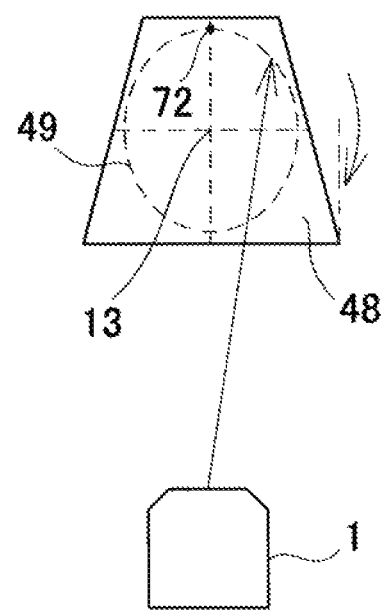
FIG. 15A is an explanatory diagram illustrating a case in which the inclination is measured of an inclined measurement target object surface.
Figure 15B:
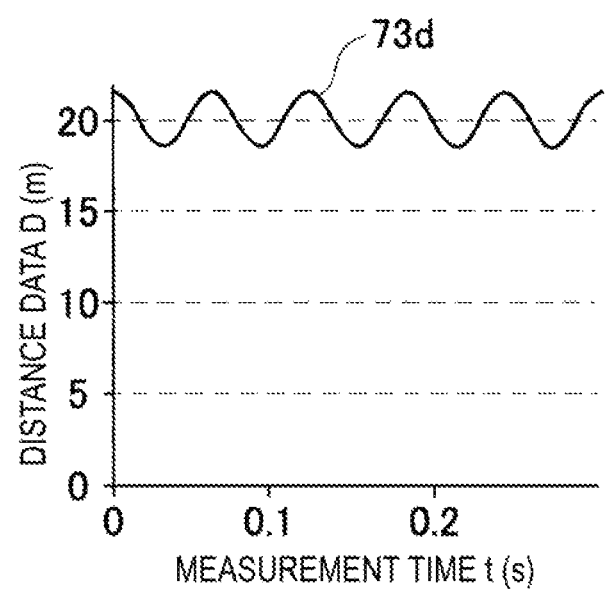
FIG. 15B is a graph illustrating a sine wave in the situation illustrated in FIG. 15A.

FIG. 15A illustrates a case in which the measurement target object surface 48 is inclined at the same inclination angle as in FIG. 14A about a horizontal axis passing through the emission optical axis 13 (a case in which the measurement target object surface 48 is rotated in a vertical direction about a horizontal axis) such that the lower side of the measurement target object surface 48 is at the nearside and the upper side thereof is at the far side. In the rangefinding results, the values of the distance data are large at the upper side of the measurement target object surface 48 and the values of the distance data at the lower side thereof are small in such a case. A comparison of the sine wave 73d illustrated in FIG. 15B and the sine wave 73c indicates that the phase of the sine wave 73d leads from that of the sine wave 73c by 90° and has the same amplitude as the sine wave 73c.

Moreover, if the measurement target object surface 48 is rotated in the direction opposite to the direction in the state illustrated in FIG. 15A, then the phase of the sine wave 73d delays from that of the sine wave 73c by 90°. A change in the inclination direction of the measurement target object surface 48 accordingly appears as a change in the phase of the sine wave 73, and the magnitude of the inclination angle (inclination amount) accordingly appears in the magnitude of the amplitude.

As described above, when the inclination angle of the measurement target object surface 48 changes, the amplitude of the sine wave 73 changes, and when the inclination direction of the measurement target object surface 48 changes, the phase of the sine wave 73 changes. Thus, the inclination angle and inclination direction of the measurement target object surface 48 with respect to the measurement device 1 can be measured on the basis of the waveform, namely, the magnitude of the amplitude and the phase shift, of the sine wave 73.

Figure 16:
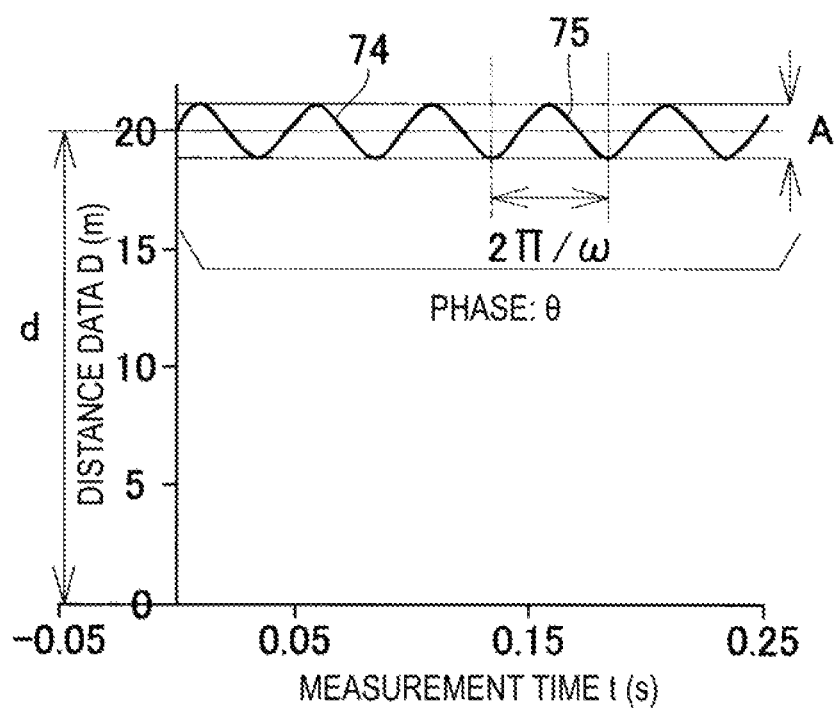
FIG. 16 is a graph illustrating parameters employed when performing inclination measurement on the basis of a sine wave obtained from measurement results.

Moreover, as illustrated in FIG. 16, one period of a sine wave 75 may be fitted to a sine wave 74 obtained from a relationship between the distance data D and a measurement time t, and the inclination of the measurement target object surface 48 with respect to the measurement device 1 may be measured on the basis of the fitted sine wave. The measurement reference point 72 does not need to be set in such cases.

In FIG. 16, the sine wave 75 fitted to the sine wave 74 can be expressed by the following equation, wherein: d is the average distance to the measurement target object surface 48; A is a coefficient representing an inclination amount of the measurement target object surface 48; ω is the rotation speed of the optical axis deflection section; and θ is a coefficient indicating the positional relationship (indicating the phase) of the measurement device 1 and the measurement target object surface 48. Note that ω is a variable controllable by the measurement device 1, and the other values are measurement values.

$$D = A \times \sin(\omega t + \theta) + d$$

The angular relationship (inclination amount and inclination direction) of the measurement target object surface 48 with respect to the measurement device 1 can be measured on the basis of the values in the above Equation for A and θ obtained by fitting calculations.

Figure 17:
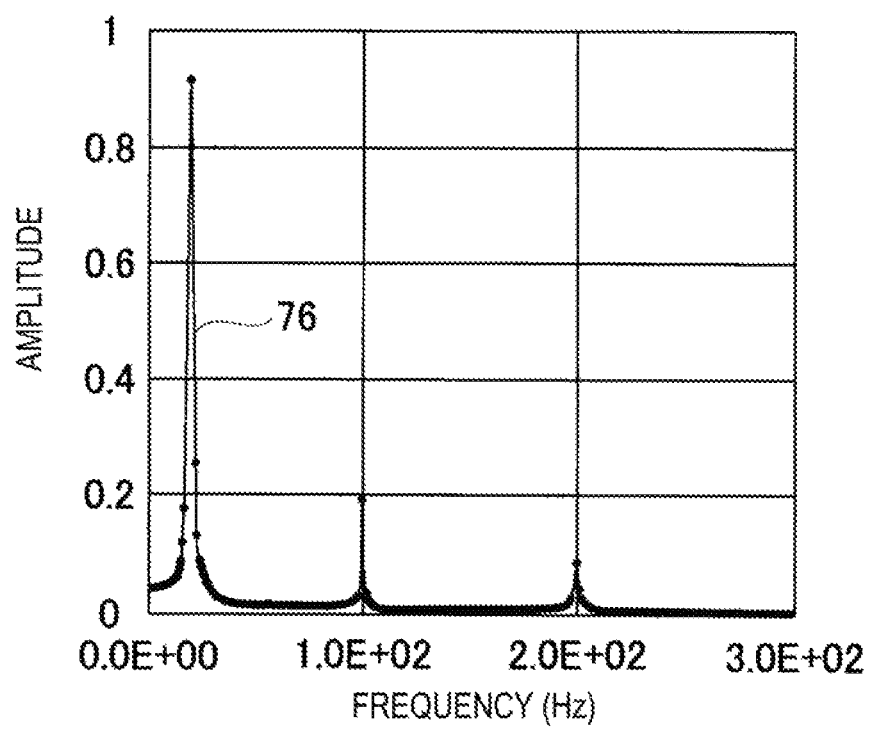
FIG. 17 is a graph illustrating a case in which a sine wave obtained from measurement results has undergone Fourier transformation.

Moreover, as illustrated in FIG. 17, Fourier transformation may be executed on the sine wave 74, and the inclination of the measurement target object surface 48 with respect to the measurement device 1 may be measured from the amplitude A and the phase θ found from the transformation result.

In FIG. 17, a frequency component 76, which is the main frequency component, is a frequency component matching the rotation speed of the optical axis deflection section. A normal line vector 54 (see FIG. 4) to the measurement target object surface 48 is found from the amplitude and phase value of the frequency component 76, and the inclination of the measurement target object surface 48 with respect to the measurement device 1 can be computed on the basis of the normal line vector 54.

Note that when measuring the measurement target object surface 48 by Fourier transformation, the frequency component 76 to determine the inclination of the measurement target object surface 48 is a parameter determined by the rotation speed of the optical axis deflection section, and is a value controllable by the measurement device 1. Thus, the inclination of the measurement target object surface 48 can be measured at high precision even in cases in which there is fine unevenness on the measurement target object surface 48. Namely, Fourier transformation can be made to function to filter the fine unevenness.

Alternatively, a smoothing method may be implemented such as taking a moving average in order to filter the fine unevenness.

What is claimed is:
1. A measurement device comprising:
   a rangefinding light emitting section configured to emit rangefinding light;
   a rangefinding unit configured to receive reflected rangefinding light reflected from a measurement target object and perform rangefinding;
   an optical axis deflection section provided on an optical path common to the rangefinding light and the reflected rangefinding light, and configured to deflect optical axes of the rangefinding light and the reflected rangefinding light at the same deflection angle and the same direction as each other;
   a motor configured to cause the optical axis deflection section to rotate about an emission optical axis of the rangefinding light;
   an emission direction detection unit configured to detect a deflection angle and deflection direction resulting from the optical axis deflection section; and
   a computation controller; wherein
   a measurement target object surface is scanned in a circular shape with the rangefinding light by rotation of the optical axis deflection section; and
   the computation controller measures an inclination of the measurement target object surface with respect to the emission optical axis on the basis of acquired coordinate data on the measurement target object surface.

2. The measurement device according to claim 1, wherein:
the optical axis deflection section includes
a wedge prism, and
a deflection angle adjustment motor configured to cause the wedge prism to tilt about an axis orthogonal to the emission optical axis; and
a deflection angle of the rangefinding light can be varied by the deflection angle adjustment motor being driven.

3. The measurement device according to claim 2, further comprising:
an orientation detection device capable of detecting an inclination angle and inclination direction with respect to the horizontal or the vertical; wherein
an inclination of the measurement target object surface with respect to the horizontal or the vertical is measured on the basis of the coordinate data and an orientation detection result.

4. The measurement device according to claim 3, wherein the computation controller:
rotates the motor at a predetermined speed;
computes a difference between a target rotation angle and an actual rotation angle of the motor at intervals of a predetermined duration;
corrects the target rotation speed of the motor on the basis of the difference; and
controls the motor on the basis of the target rotation speed that is corrected and an actual rotation speed.

5. The measurement device according to claim 4, further comprising an imaging section having an imaging optical axis parallel to and at a known distance from the emission optical axis.

6. The measurement device according to claim 1, wherein:
the optical axis deflection section includes a pair of optical prisms each having a circular shape, the pair of optical prisms being independently rotatable and superimposed on each other; and
each of the pair of optical prisms includes
a rangefinding light axis deflection section formed at a central portion of each of the pair of optical prisms and configured to deflect the rangefinding light at a required deflection angle and in a required direction, and
a reflected rangefinding light axis deflection section formed at an outer circumferential portion of each of the pair of optical prisms and configured to deflect the reflected rangefinding light at a deflection angle and in a direction identical to those of the rangefinding light axis deflection section; and
the computation controller rotates the pair of optical prisms together as one at a constant speed.

7. The measurement device according to claim 6, further comprising:
an orientation detection device capable of detecting an inclination angle and inclination direction with respect to the horizontal or the vertical; wherein
an inclination of the measurement target object surface with respect to the horizontal or the vertical is measured on the basis of the coordinate data and an orientation detection result.

8. The measurement device according to claim 7, wherein the computation controller:
rotates the motor at a predetermined speed;
computes a difference between a target rotation angle and an actual rotation angle of the motor at intervals of a predetermined duration;
corrects the target rotation speed of the motor on the basis of the difference; and
controls the motor on the basis of the target rotation speed that is corrected and an actual rotation speed.

9. The measurement device according to claim 8, further comprising an imaging section having an imaging optical axis parallel to and at a known distance from the emission optical axis.

10. The measurement device according to claim 1, further comprising:
an orientation detection device capable of detecting an inclination angle and inclination direction with respect to the horizontal or the vertical; wherein
an inclination of the measurement target object surface with respect to the horizontal or the vertical is measured on the basis of the coordinate data and an orientation detection result.

11. The measurement device according to claim 10, wherein the computation controller:
rotates the motor at a predetermined speed;
computes a difference between a target rotation angle and an actual rotation angle of the motor at intervals of a predetermined duration;
corrects the target rotation speed of the motor on the basis of the difference; and
controls the motor on the basis of the target rotation speed that is corrected and an actual rotation speed.

12. The measurement device according to claim 11, further comprising an imaging section having an imaging optical axis parallel to and at a known distance from the emission optical axis.

13. A measurement method comprising the steps of:
emitting rangefinding light and receiving reflected rangefinding light reflected from a measurement target object surface;
deflecting the rangefinding light and the reflected rangefinding light by an optical axis deflection section;
rotating the optical axis deflection section about an emission optical axis of the rangefinding light to scan the measurement target object surface in a circular shape with the rangefinding light; and
finding a sine curve on the basis of acquired coordinate data on the measurement target object surface, and measuring an inclination of the measurement target object surface with respect to the emission optical axis on the basis of an amplitude and phase of the sine curve.

14. The measurement method of claim 13, further comprising:
performing Fourier transformation on the sine curve; and
measuring the inclination of the measurement target object surface with respect to the emission optical axis on the basis of an amplitude and phase of a frequency component obtained from the Fourier transformation matching a rotation speed of the optical axis deflection section.

* * * * *